United States Patent [19]
Daniels et al.

[11] Patent Number: 5,310,349
[45] Date of Patent: May 10, 1994

[54] INSTRUCTIONAL MANAGEMENT SYSTEM

[75] Inventors: Dan B. Daniels, San Diego; Darrell M. Olps, Poway; Carl G. Reese, San Diego; Tom R. Rahlfs, Encinitas; Ronald R. Carlton, San Marcos, all of Calif.

[73] Assignee: Jostens Learning Corporation, San Diego, Calif.

[21] Appl. No.: 876,584

[22] Filed: Apr. 30, 1992

[51] Int. Cl.⁵ ............................................. G09B 3/00
[52] U.S. Cl. ................................. 434/350; 434/118; 434/307; 434/365; 364/419.2; 345/156; 395/152; 395/927
[58] Field of Search ............... 434/156, 157, 118, 169, 434/185, 307, 308, 322, 323, 327, 335, 350, 362, 365; 395/100, 152, 153, 160, 200, 650, 927; 364/411, 419; 340/706, 709, 717, 825.5, 825.51; 370/94.1, 94.3, 85.1–85.3, 85.13, 85.14; 345/145, 146, 156

[56] References Cited

U.S. PATENT DOCUMENTS

| | | | |
|---|---|---|---|
| 3,405,457 | 10/1968 | Bitzer | 434/323 |
| 3,757,037 | 9/1973 | Bialek | 364/900 X |
| 4,360,345 | 11/1982 | Hon | 434/323 X |
| 4,576,578 | 3/1986 | Parker et al. | 434/307 |
| 4,601,003 | 7/1986 | Yoneyama et al. | 395/160 X |
| 4,820,167 | 4/1989 | Nobles et al. | 434/335 X |
| 4,867,685 | 9/1989 | Brush et al. | 434/234 |
| 4,895,518 | 1/1990 | Arnold et al. | 434/350 X |
| 5,002,491 | 3/1991 | Abrahaneson et al. | 434/324 X |
| 5,035,625 | 7/1991 | Munson et al. | 434/335 X |
| 5,111,409 | 5/1992 | Gasper et al. | 395/152 |

*Primary Examiner*—Richard J. Apley
*Assistant Examiner*—Joe H. Cheng
*Attorney, Agent, or Firm*—Merchant, Gould, Smith, Edell, Welter & Schmidt

[57] ABSTRACT

A virtual school user interface running on networked personal computers for providing administrative and instructional functions to users in a scholastic environment. A user selects among grouped system functions by accessing one of a plurality of rooms within a school representation displayed on a video screen, with the networked virtual reality presenting the user as a real-time entity within the virtual school so that the user can interact with other users and system elements. A learning path editor is also provided for allowing users to author student curriculum sequences using graphical icons. A guidance tutor is further provided for coaching a student by displaying a guidance message on the video screen when so indicated by an instructional context. A courseware scheduler is further provided for delivering specific courseware to specific computers during specific time periods. A system monitor is further provided for gathering information in real-time on the state of each computer.

19 Claims, 20 Drawing Sheets

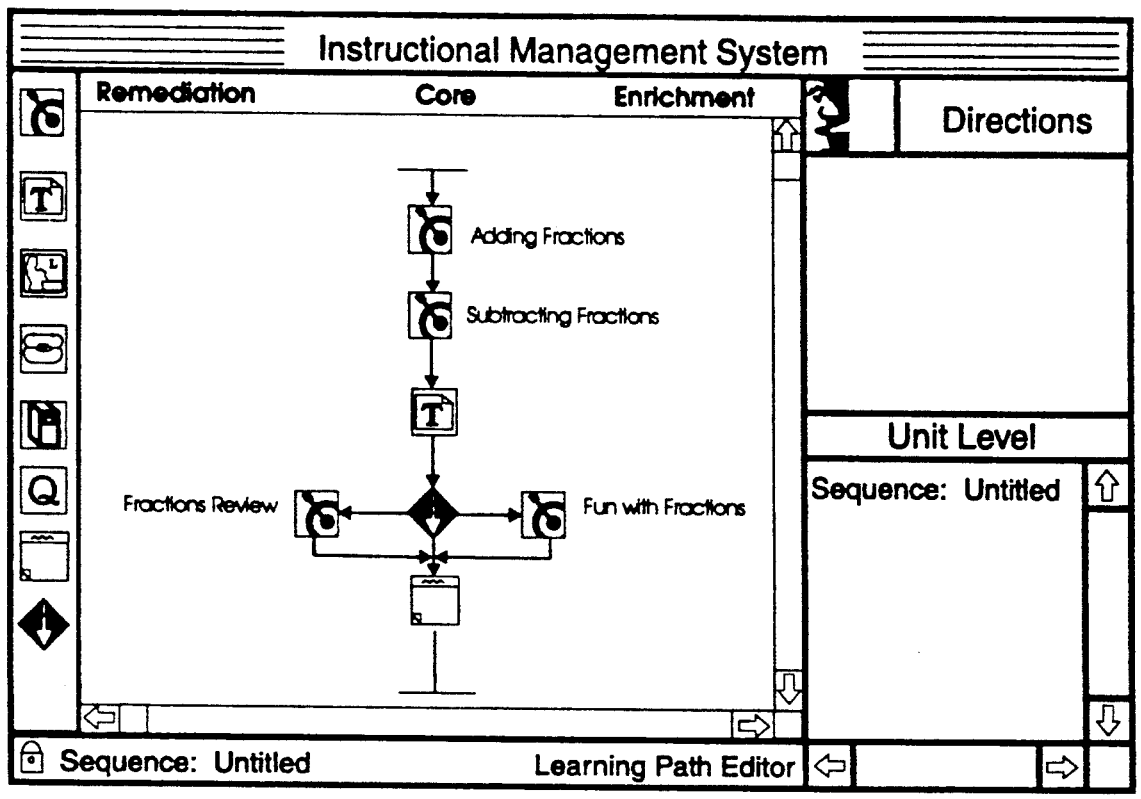
| | | | |
|---|---|---|---|
|  | Unit |  | Reference Tool |
|  | Unit Test |  | Lesson Test (Quiz) |
|  | Lesson |  | Transition Screen |
|  | Productivity Tool |  | Decision Box |
*Fig. 18*

INSTRUCTIONAL MANAGEMENT SYSTEM

BACKGROUND OF THE INVENTION

1. Field of the Invention

The present invention pertains to the field of computerized administrative systems, and more particularly to a networked instructional management system targeted to scholastic environments.

2. Description of Related Art

In recent years, the power of personal computers has grown remarkably while their price has steadily fallen. By connecting a number of personal computers together via a local area network (LAN), it is possible to create a system that is flexible and cost-effective for automating many functions within businesses and institutions.

One such institution that may benefit from a networked computer system is that of schools. In a typical school, one computer system might be used to provide administrative functions for running the school and tracking the progress of students, while another computer system might be used for computer assisted instruction (CAI) within the classroom. Having multiple computer systems within a school presents difficulties in sharing critical information between the systems as well as presenting different user interfaces that must be learned separately by staff, faculty, and students.

By using an appropriate management system, it is possible to combine administrative functions such as student monitoring and tracking and curriculum authoring, with such CAI functions as courseware delivery and student coaching. The management system should provide an easy to use interface appropriate to users of all ages and skills.

Therefore, there is a need to combine administrative and CAI capabilities within a single computer system and allow users to select system functions in a simple and intuitive manner. There is also a need to provide a easy way to author student curriculum sequences. There is an additional need to provide an effective way to coach a student if the student is not progressing through a curriculum as expected. There is a further need to deliver specific courseware to specific computers during specific time periods. There is a further need to monitor in real-time the status of each computer on the network.

SUMMARY OF THE INVENTION

To overcome the limitations in the prior art described above, and to overcome other limitations that will become apparent upon reading and understanding the present specification, the present invention discloses a virtual school user interface running on networked personal computers for providing administrative and instructional functions to users in a scholastic environment. A user selects among grouped system functions by accessing one of a plurality of rooms within a school representation displayed on a video screen, with the networked virtual reality presenting the user as a real-time entity within the virtual school so that the user can interact with other users and system elements. A learning path editor is also provided for allowing users to author student curriculum sequences using graphical icons. A guidance tutor is further provided for coaching a student by displaying a guidance message on the video screen when so indicated by an instructional context. A courseware scheduler is further provided for delivering specific courseware to specific computers during specific time periods. A system monitor is further provided for gathering information in real-time on the state of each computer.

BRIEF DESCRIPTION OF THE DRAWINGS

Referring now to the drawings in which like reference numbers represent corresponding parts throughout:

FIG. 18 illustrates a sample curriculum sequence constructed as a flow chart using a learning path editor compatible with the present invention;

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

General Description

The Instructional Management System (IMS) of the present invention is designed for use in scholastic environments. The IMS is a computer user interface apparatus for presenting text and graphics information to a user. The apparatus operates on a local area network of one or more computers connected together. Each computer has user input means, a video screen, and data storage means coupled thereto. In addition, instructional and administrative information is stored in an electronic format in the data storage means of the computer.

The user interface is a "virtual school" that provides a networked virtual reality environment so that one or more users can access the instructional and administrative information by grouped functions. Within the virtual school, the user selects among the grouped functions by accessing one of a plurality of rooms within a school representation displayed on the video screen. The networked virtual reality environment thereby presents the user as a real-time entity within the virtual school so that the user interacts with other users and elements therein.

Among the functions provided by the present invention are the following:
1) deliver a customized sequence of appropriate learning events to each student;
2) direct and monitor student progress and various on-line and offline activities and tailor instruction to fully integrate them into the classroom;
3) adapt a standard sequence of curricula and prescribe lessons from third-party materials;
4) branch students to appropriate remedial or enrichment activities;
5) generate criterion-referenced pretests and post-tests; and
6) create, maintain, and update instructional records on each student and electronically transfer records within and between schools.

Network Description

The IMS preferably operates on a network comprised of a group of workstations connected together to communicate with each other and to share peripherals such as printers and data storage devices. The user perceives the system according to the workstations and the rooms in which they reside.

From the user's point of view, there are primarily two models of how IMS is employed: (1) a lab model, where the network is confined to one room, and (2) a distributed model, where the network is distributed throughout several rooms.

Figure 1:
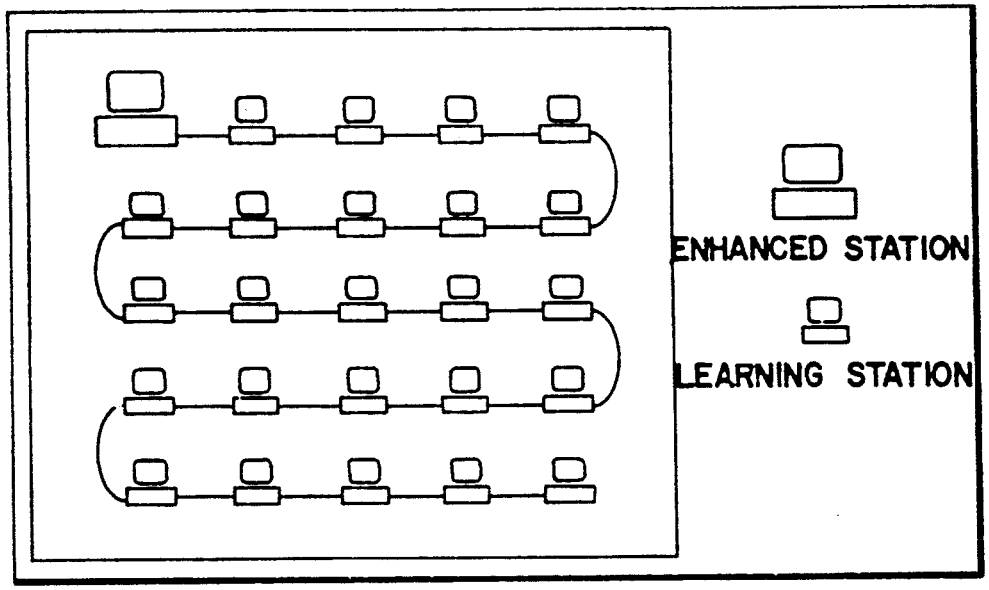
FIG. 1 is a general block diagram of a virtual school lab model compatible with the present invention.

FIG. 1 illustrates the lab model in one room. In typical usage, the room is dedicated and students enter the lab in groups according to a predefined schedule.

Figure 2:
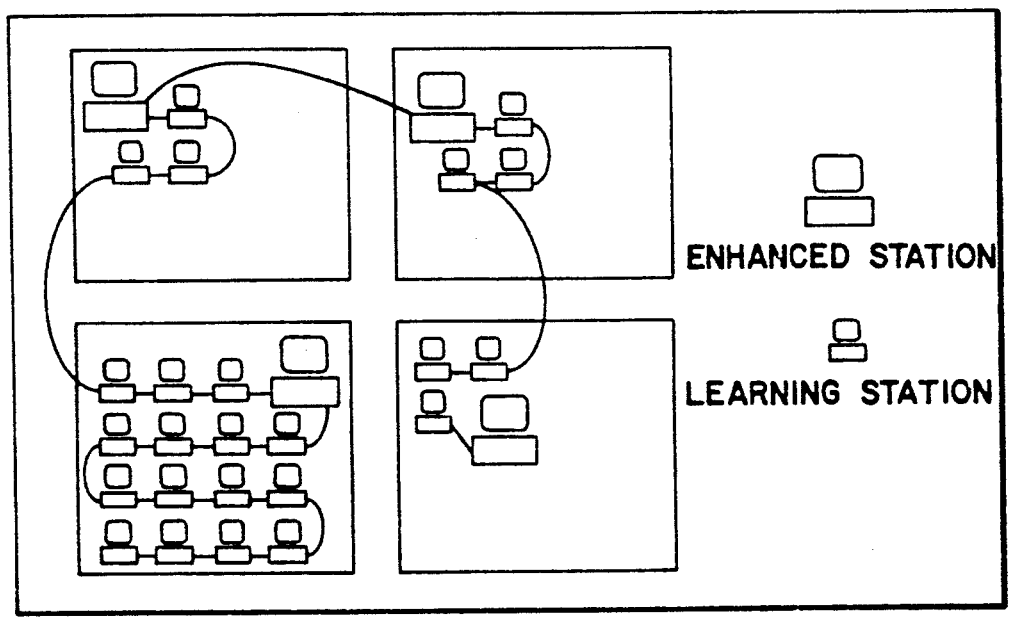
FIG. 2 is a general block diagram of a virtual school distributed model compatible with the present invention.

FIG. 2 illustrates the distributed model in a plurality of rooms. The distributed model has workstations in rooms which may or may not be dedicated to the use of computers. Students use the computers at the teacher's discretion. The IMS can be accessed from any workstation on the network.

There are two basic types of workstations operating in conjunction with IMS, i.e., a learning station and a enhanced station. The learning station is typically a low-end machine which is capable of delivering basic courseware and productivity tools to the user. The enhanced station is a more powerful workstation which may be capable of delivering the full range of user applications available in IMS depending upon its hardware capabilities. The lab model has at least one enhanced station and this typically is the teacher or system attendant workstation. The distributed model uses the same types of stations as the lab model, although there may be proportionately more enhanced stations in the distributed model to allow each teacher access to the full range of user applications.

Figure 3:
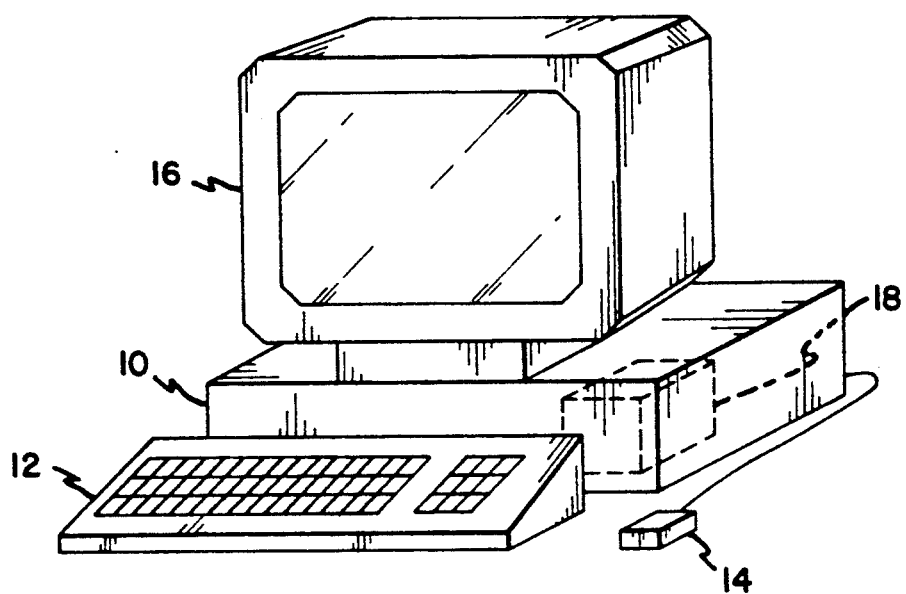
FIG. 3 is a perspective view of the functional elements of a workstation compatible with the present invention.

FIG. 3 shows the functional elements of a typical workstation. The workstation comprises a computer 10, a keyboard 12, a pointing device such as a mouse 14, and video display screen 16. Many of the functions of the IMS are embodied in software 18 executing on the computer 20.

Virtual School

Figure 4:
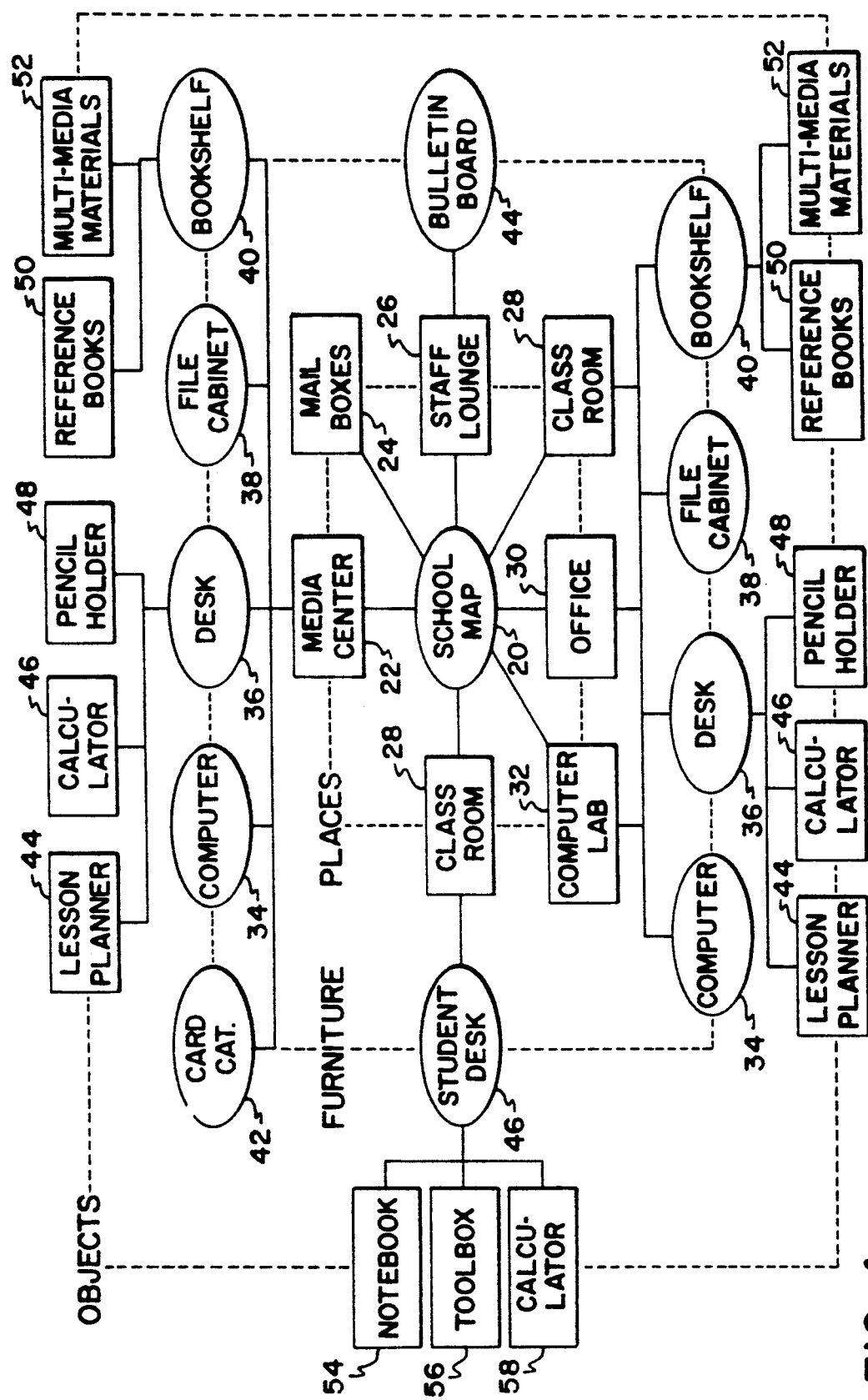
FIG. 4 is a general block diagram of logical elements in a virtual school compatible with the present invention.

FIG. 4 provides a summary of the virtual school's logical organization. As can be seen in the drawing, there are three hierarchical levels: places, furniture, and objects. These hierarchical levels are represented by graphical user interfaces and icons displayed on the video display screen 16 of the computer 10 as described in more detail herein.

The user begins navigating through the virtual school at the school map 20 and can reach six other places: media center 22, mailboxes 24, staff lounge 26, classroom 28, office 30, and computer laboratory 32, depending on the access level of the user.

The next level in the virtual school hierarchy is that of furniture. From the media center 22, classroom 28, office 30, and computer laboratory 32, there are four pieces of furniture that are displayed: a computer 34, a desk 36, a file cabinet 38, and a bookshelf 40. Within the media center 22, an additional piece of furniture, a card catalog 42, is displayed. From the staff lounge 26, only one piece of furniture, a bulletin board 44, is displayed. From the classroom 28, an additional piece of furniture, the student desk 46, can be accessed.

The last level in the virtual school hierarchy is that of objects. There are three pieces of furniture that have objects: the regular desk 36, bookshelf 40, and the student desk 46. From the student desk 46, a notebook 54, a toolbox 56, and a calculator 58 are available. From the regular desk 36, a lesson planner 44, a calculator 46, and a pencil holder 48 are available. And finally, from the bookshelf 40, reference books 50 and multimedia materials 52 are available.

Screen Format

The user interface of the virtual school follows a common format including a main panel, directions panel, list panel, and status panel. The main panel presents information along substantially the majority of one side of the screen and typically includes the graphical representations of the virtual school. The directions panel guides the user in correct and efficient use of the user interface by displaying instructions on the video screen, including text directed to on-line training and help functions for the user interface and a tutor presenting audio or full-motion video on the video screen in conjunction with the text. The list panel presents information from a currently active database on the video screen. The status panel displays a message indication describing which room the user is in and the function being performed.

Front Door Screen

Figure 5:
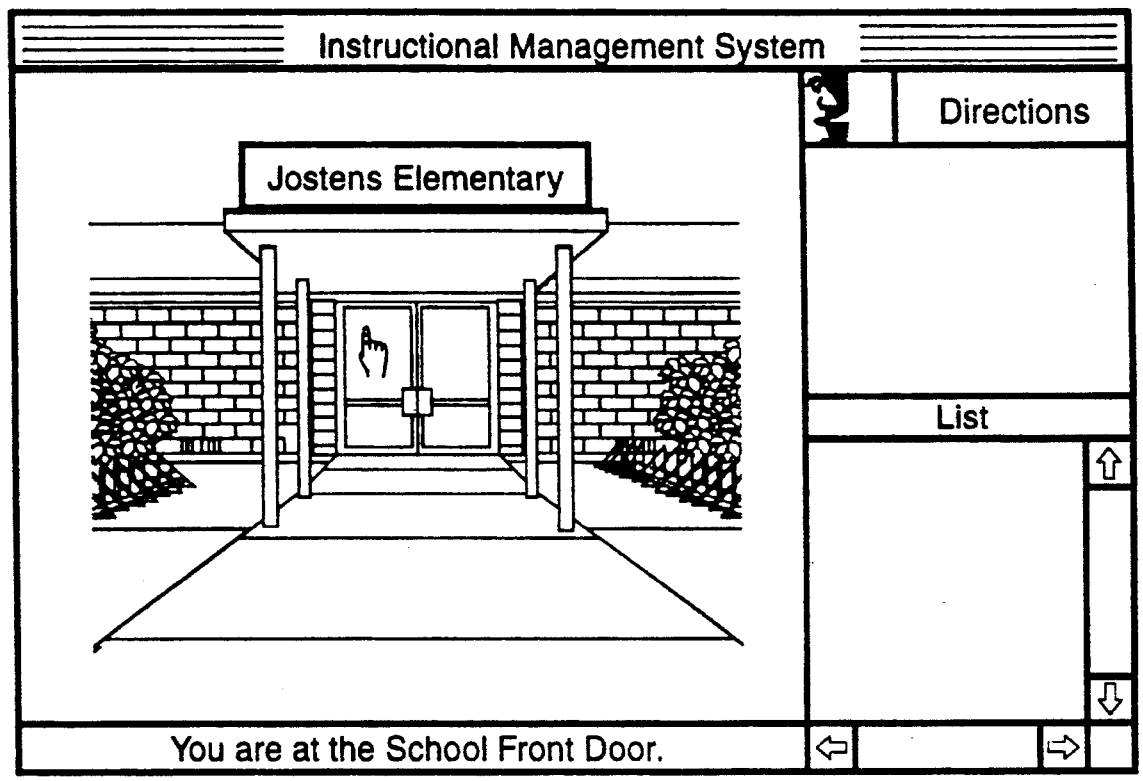
FIG. 5 is a screen view of a virtual school front door compatible with the present invention.

FIG. 5 illustrates the first screen of the user interface, which screen is displayed to a user at an unassigned station (e.g., one that has not been scheduled to deliver lessons to a specific student at a specific time). The first screen contains a front door graphic which represents the functions that provide entry into the virtual school. The name of the school appears in the sign above the front door. To enter the school, the user positions a cursor on the front door with the pointing device and selects the door by clicking a button or by any other appropriate pointing device or selection means.

School Security Screen

Figure 6:
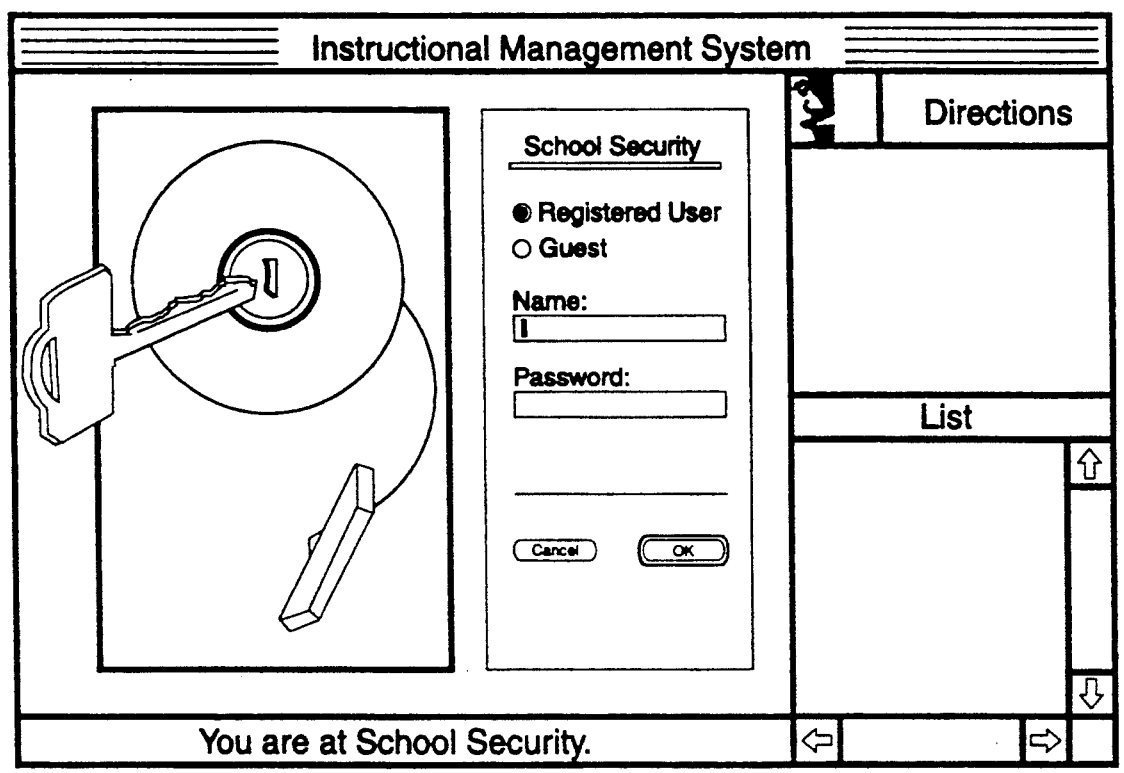
FIG. 6 is a screen view of a virtual school security display compatible with the present invention.

FIG. 6 illustrates the school security screen, which is the second screen presented to an IMS user after the front door screen has been accessed. The school security screen controls access to the IMS. Every user who regularly uses the system is registered under one of the six main user access classes. Each user access class has its own set of access privileges to the applications and files in the system. No one else may log on to the station unless they use an override code, which clears the name field and allows another user to log on to the system.

If the user is an assigned student who is scheduled to use a workstation at a specific time, this is the first screen that is displayed and the student's name appears in the name field.

If a user is not a registered user of the system, the user may log on for demonstration or training purposes by clicking a guest button displayed on the screen. Guests can view blank forms and reports, student monitoring, and the learning path editor, but they cannot add, change, or delete information anywhere in the system.

User Classifications

There are six different classes of users that can access the IMS, the first being that of the administrator group. Members of the administrator group have access to all courseware, references, student, teacher and administrator productivity tools, and access to all student and teacher records.

The administrator access class contains six subgroups. The first subgroup is that of principal. A principal has access to available IMS features including administrative reports, system monitoring, student registration, and staff registration.

The second administrative subgroup is that of administrative assistant. An administrative assistant has access to administrative reports, system monitoring, student registration, and staff registration functions.

The third administrative subgroup is that of nurse. Nurses have access to medical, health, and emergency records.

The forth administrator subgroup is that of system attendant. The duties of a system attendant include system monitoring and maintenance, annotating network errors in the system log, system administration, system backup, system update, laboratory layout, and possible enrollment of students.

The fifth administrator subgroup is that of curriculum specialist. The curriculum specialist designs units and sequences of courseware lessons. This user has complete access to the lesson sequence generator and has full editorial control over its associated data. This user may be a vendor employee or a district or school employee.

The sixth and final subgroup of the administrator group is that of district administrator. On the district level, administrators can request all reports that are available at individual school sites. They can request reports that compare data of different schools and they can transfer the records of a student from one school to another. It is advisable that the original schools' records be annotated about the transfer but not deleted by district level action.

The second main user access class is that of a guest. A guest has access to all courseware, references, and student and teacher productivity tools but has restricted access to all available reports.

The third main user access class is that of parent. A parent has access to all courseware, references, and student productivity tools and has access to their own child's work and parent reports about that child.

The fourth main user access class is that of student. A student has access to assigned courseware references and student productivity tools but is restricted to access only the student's work. Certain lessons or materials may be presented to a group of students from a single computer rather than each student working individually. Students not in the group may need to take this material individually. The material might be an ordinary lesson that a teacher wishes to amplify by group or classroom presentation.

The fifth main user access class is that of teacher. Teachers have access to all courseware, references, student and teacher productivity tools, and scheduling and assigning students. They have restricted access to only the records of the students assigned to them. The features available to the teacher include curriculum assignment, lesson planning, test creation, system monitoring, and access to instructional reports.

Within the teacher group there are three different subgroups. The first teacher subgroup is that of regular teacher. The regular teacher is limited to access of records of students in sections.

The second teacher subgroup is that of a substitute teacher. A substitute teacher has access to student records for a particular section. Access is restricted only to a particular time period.

The third teacher subgroup is that of media specialist. A media specialist may add and delete access to a card catalog of references (data base information on all books, video tapes, audio tapes, and films used in instruction) that are not specifically kept in the classroom. Productivity tools specifically available in the media center are the card catalog, and may include an electronic encyclopedia such as *Compton's Multimedia Encyclopedia*, and may include an electronic dictionary such as the *Merriam-Webster Dictionary*.

The sixth main user access class is that of a vendor. A vendor is a technician who initially installs and configures the system. Configuration may involve activating or suppressing certain features of the system. The vendor may also have access to special system usage or performance reports. They may also have access to helpful system debugging reports. A vendor inputs a report to the IMS describing each visit.

Hallway Screen

Figure 7:
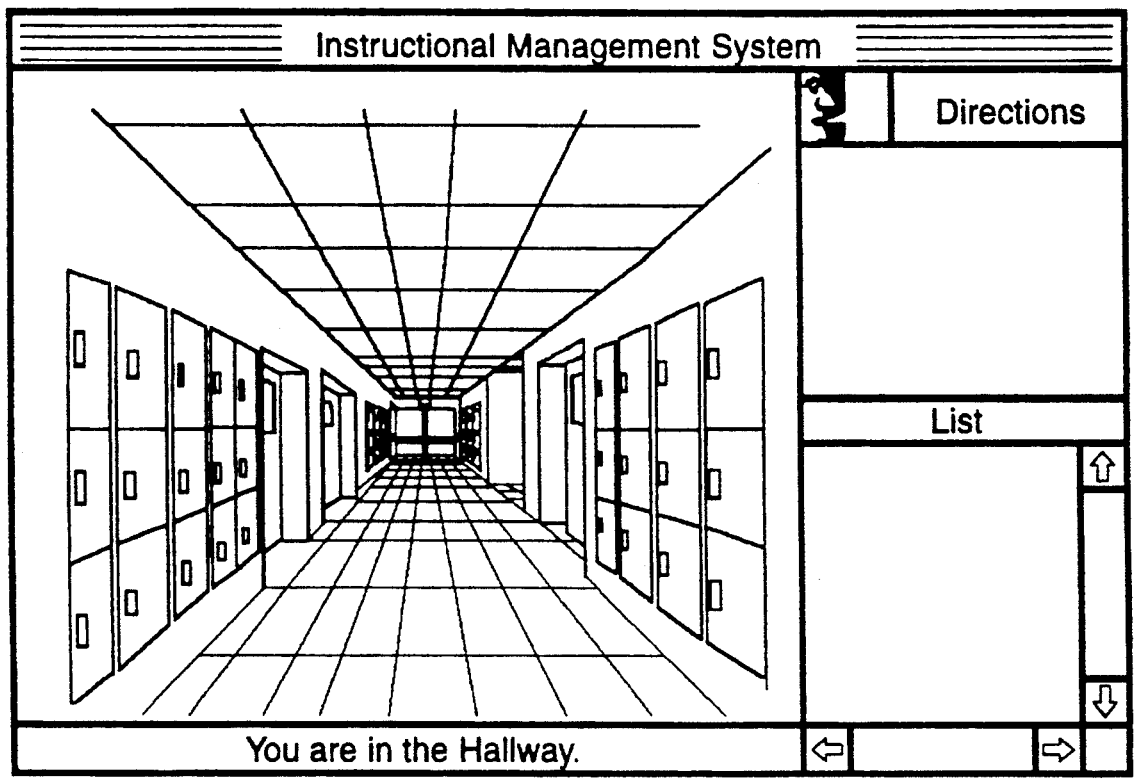
FIG. 7 is a screen view of a virtual school hallway compatible with the present invention.

After a user has logged in to the system, they are presented with a hallway screen as described in FIG. 7. The hallway screen adds to the illusion that a user is walking through a school. The hallway displays for a few seconds when the user goes from one room to another room in the virtual school.

Figure 8:
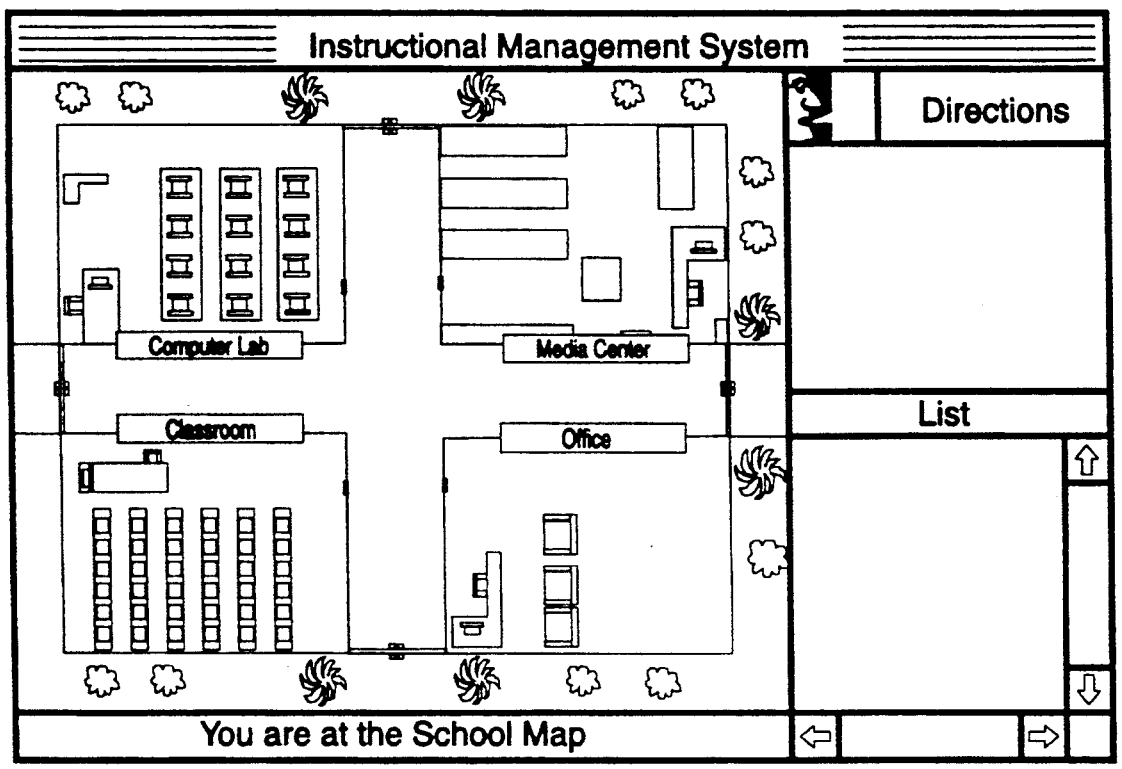
FIG. 8 is a screen view of a virtual school map compatible with the present invention.
Figure 9:
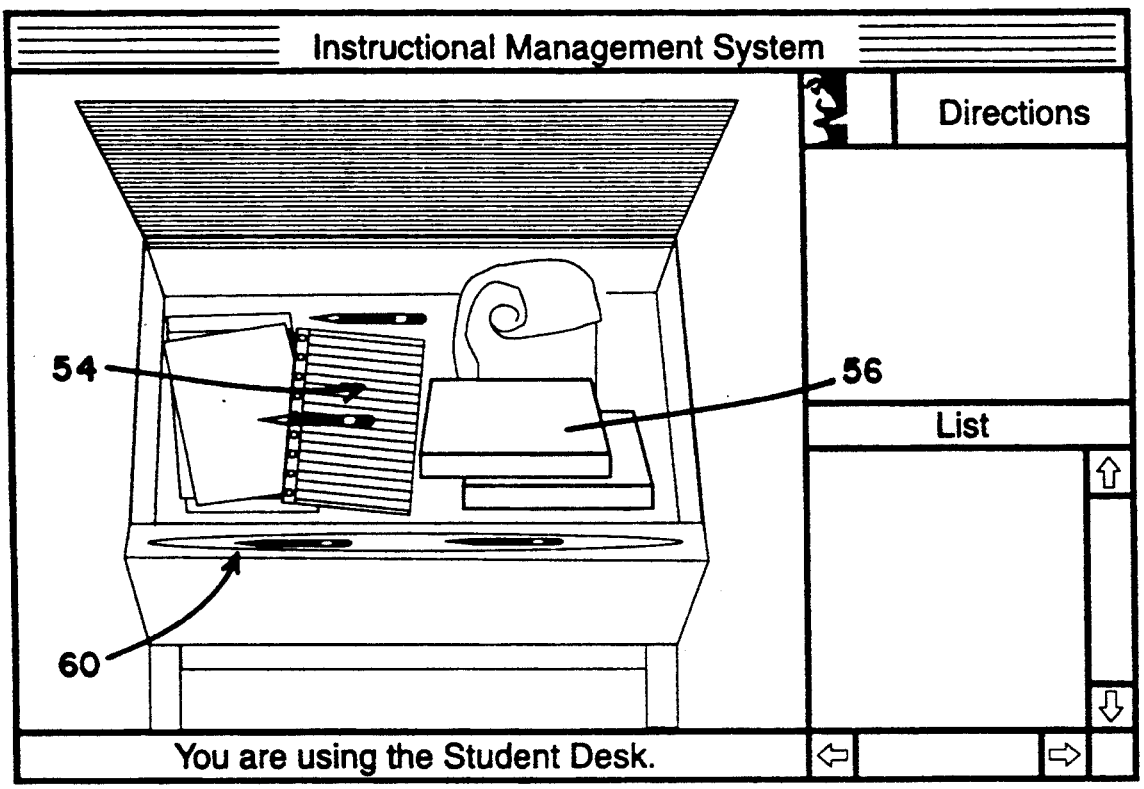
FIG. 9 is a screen view of a virtual school student desk compatible with the present invention.

From the hallway screen, there are two different paths. If the user is not a student, the IMS takes the user to the school map as shown in FIG. 8. If the user is a student, the system takes the user to the student desk as illustrated in FIG. 9.

School Map Screen

FIG. 8 illustrates the school map screen that displays representations of all of the rooms in the virtual school and provides access to the different rooms in the virtual school. Each room provides access to certain functions as described further herein. Some functions may be performed in all of the rooms, others only in a specific room.

The school map is not a map of the user's real life school. It is a map of an imaginary virtual school and is used to divide the functions of the IMS into logical groupings: administration in the office, instruction in the classroom, network operation in the computer lab, and access to resource materials in the media center. To go to a room, the user positions a cursor to any part of the desired room and the mouse button is clicked.

Student Desk Screen

FIG. 9 illustrates the student desktop screen that provides access to learning functions in the IMS including the selection of a course sequence to be taught. When the student logs on, the IMS displays a list of the sequences that have been assigned to this student, and the student then selects which of these sequences that they wish to see. The student desk allows the user access to a notebook 54, a student writing tool 60, and a toolbox 56. If the student selects the notebook 54, a list of the student's previously saved files is displayed. If the student writing tool 60 is selected, the student is routed to a word processing program. If the toolbox 56 is selected, a list of student productivity tools is presented from which the student may choose a desired tool.

Computer Laboratory Screen

Figure 10:
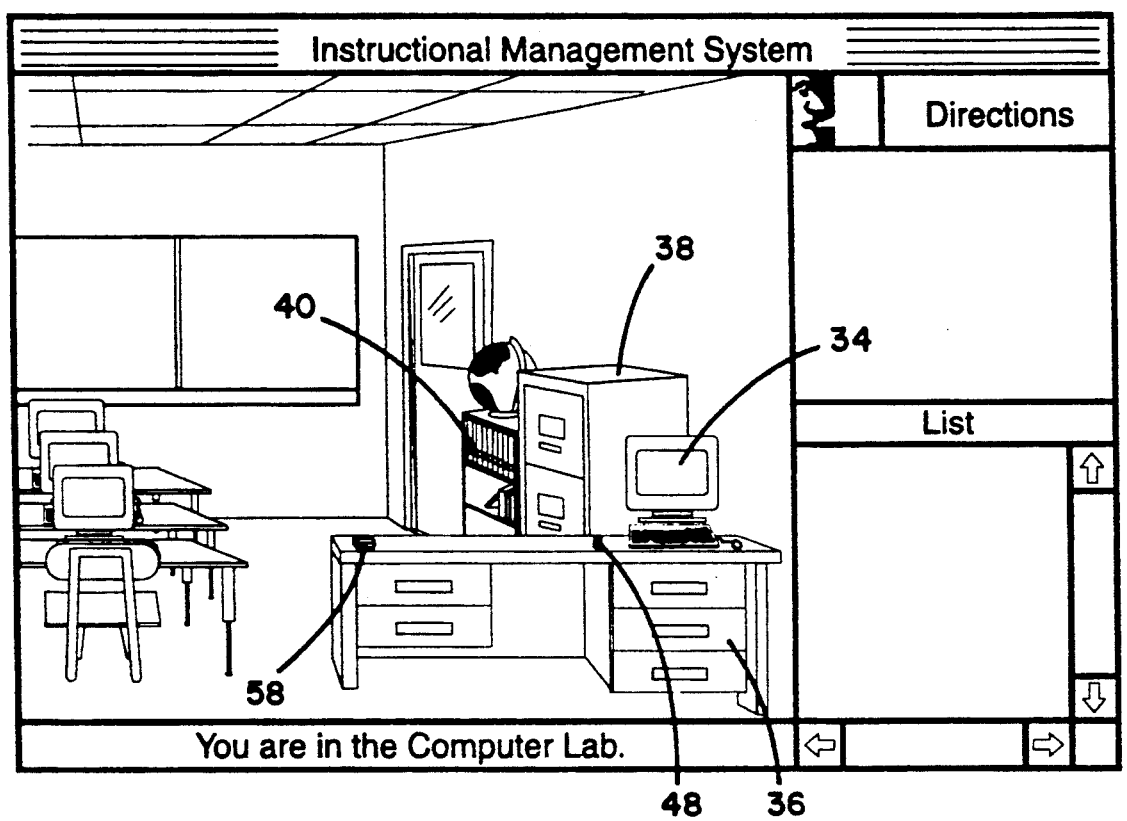
FIG. 10 is a screen view of a virtual school computer laboratory compatible with the present invention.

FIG. 10 illustrates that computer laboratory screen that provides access to system management functions in the IMS. The computer laboratory screen includes a computer 34, a pencil holder 48, a calculator 58, a desk 36, a file cabinet 38, and a bookshelf 40. The activity in this room focuses on running and maintaining the IMS. Almost all of the IMS functions are available in the computer laboratory including:

1) school setup;
2) learning path editor;
3) courseware assignment;
4) scheduling;
5) reports;
6) system monitoring;
7) system and error logs;
8) system maintenance;
9) application maintenance;
10) curriculum maintenance;
11) productivity tools;
12) reference tools; and
13) utility tools.

The only function that is not available in the computer laboratory is user registration, which is done in the office.

Classroom Screen

Figure 11:
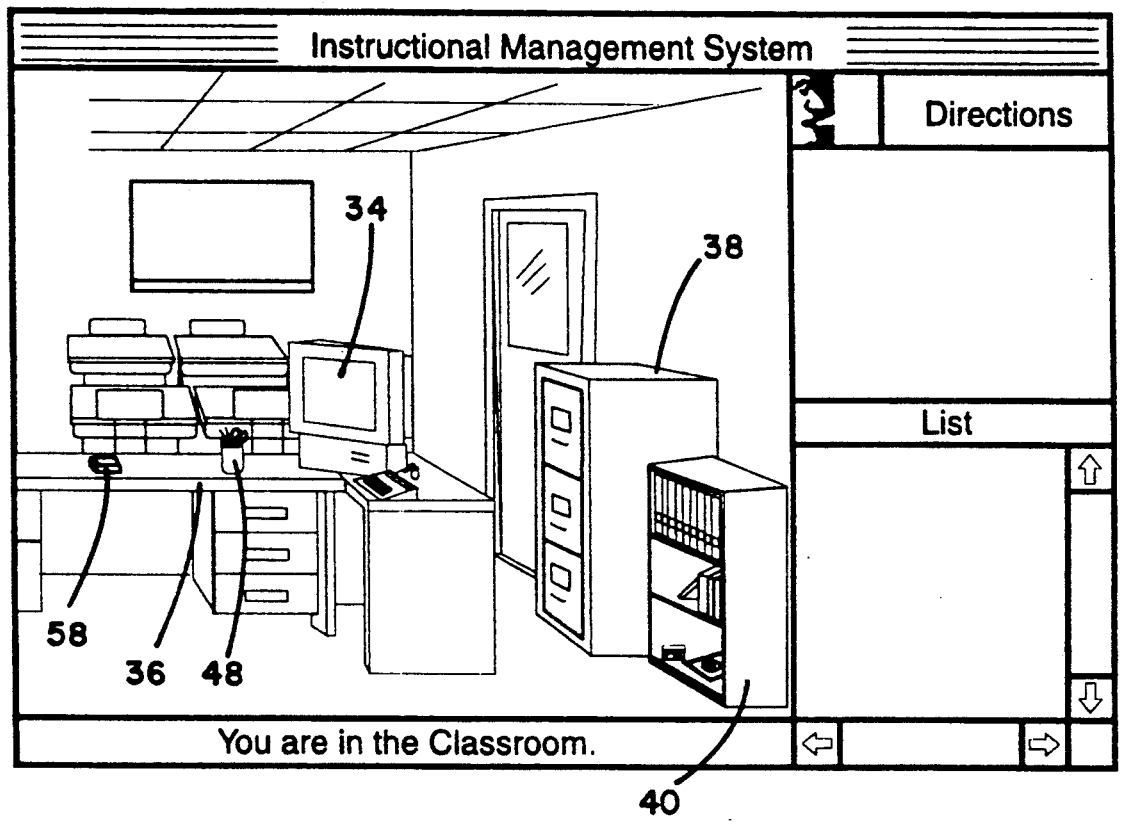
FIG. 11 is a screen view of a virtual school classroom compatible with the present invention.

FIG. 11 illustrates the classroom screen that provides shared access to lessons, tools, and references in the IMS. Within the classroom screen, other icons can be accessed, including a pencil holder 48, a calculator 58, a desk 36, a file cabinet 38, a computer 34, and a bookshelf 40. The activity in the classroom focuses on creating and assigning sequences, scheduling lessons, monitoring students, and generating reports. The IMS functions available in the classroom include:

1) learning path editor;
2) courseware assignment;
3) scheduling;
4) reports;
5) system monitoring;
6) productivity tools; and
7) reference tools.

Office Screen

Figure 12:
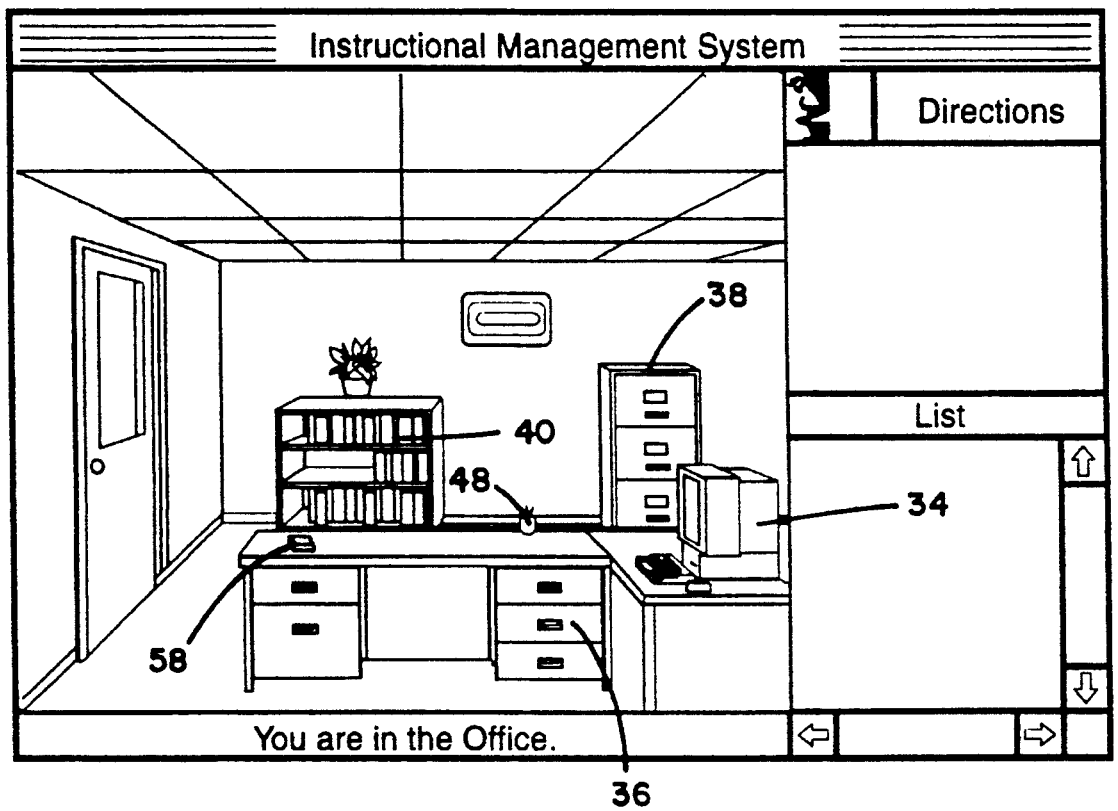
FIG. 12 is a screen view of a virtual school office compatible with the present invention.

FIG. 12 illustrates the office screen that provides access to the administrative functions in the IMS. Within the classroom screen, other icons can be accessed, including a bookshelf 40, a calculator 58, a desk 36, a file cabinet 38, a computer 34, and a bookshelf 48. The IMS functions available in the office include:

1) student registration;
2) staff registration;
3) learning path editor;
4) reports;
5) system monitoring;
6) productivity tools; and
7) reference tools.

Media Center

Figure 13:
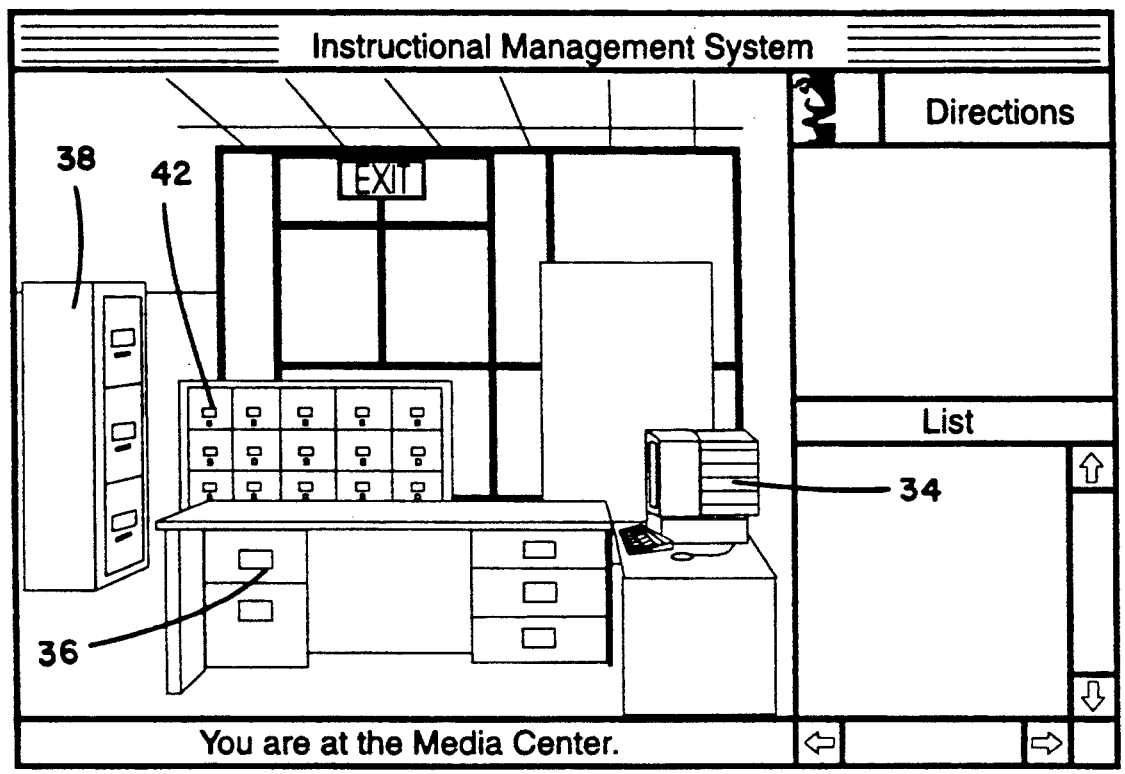
FIG. 13 is a screen view of a virtual school media center compatible with the present invention.

FIG. 13 illustrates the media center screen that provides access to the audio-visual management functions in the IMS. The media center includes a card catalog 42, a file cabinet 38, a computer 34, and a desk 36. The activity in the media center focuses on presenting instructional resources to students. The IMS functions available in the media center include:

1) reports;
2) system monitoring;
3) productivity tools; and
4) reference tools.

Lounge Screen

Figure 14:
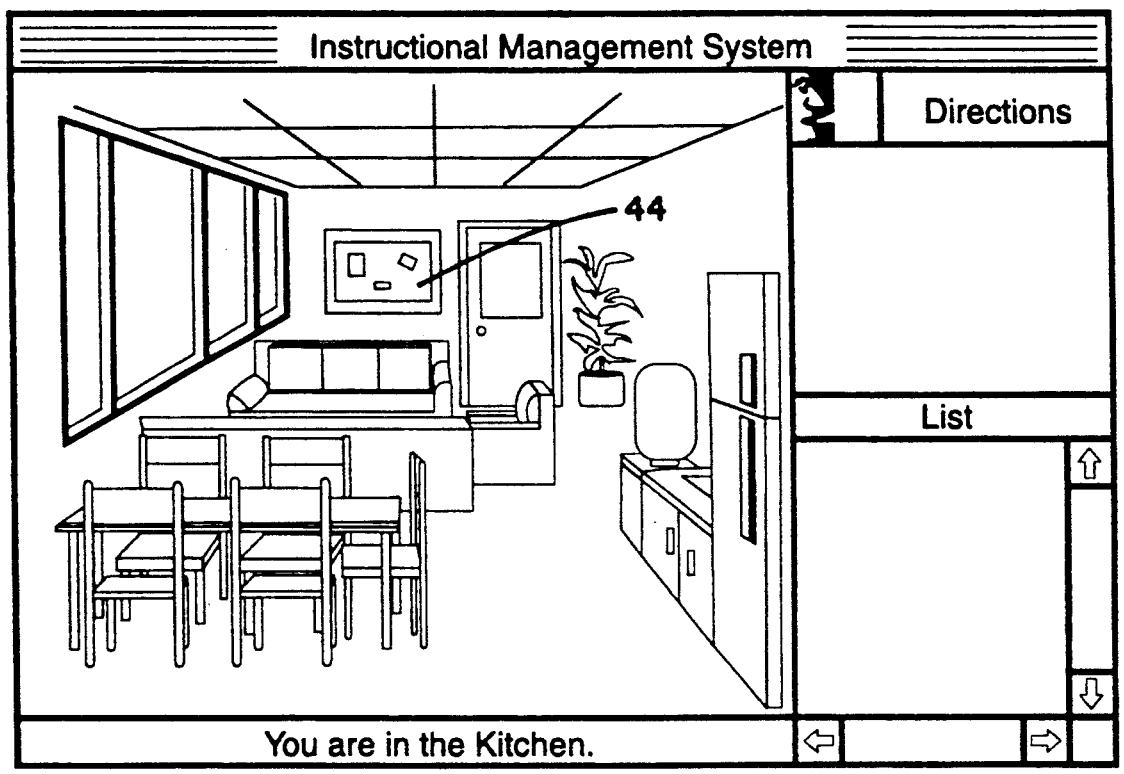
FIG. 14 is a screen view of a virtual school lounge compatible with the present invention.

FIG. 14 illustrates the lounge screen that provides access to the communications functions in the IMS, including the accessing of a public bulletin board for teachers, electronic mail, and external online information services.

Mailbox Screen

Figure 15:
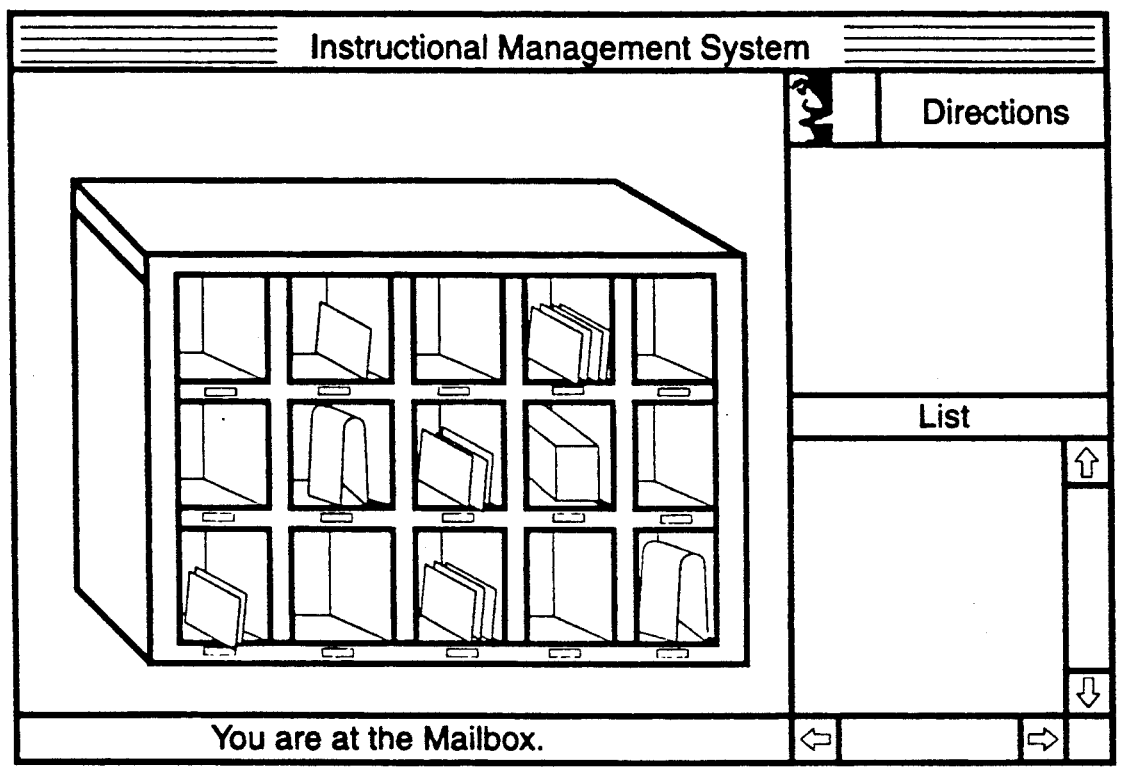
FIG. 15 is a screen view of virtual school mailboxes compatible with the present invention.

FIG. 15 illustrates the mailbox screen that provides access to the electronic mail functions of the IMS.

Computer Icon

The computer 34 allows the user to monitor and maintain the system. The functions available on the computer 34 vary from room to room.

Within the computer lab, the user may use the computer 34 for:

1) school setup;
2) system monitoring;
3) system and error logs;
4) system maintenance;

5) application maintenance; and
6) curriculum maintenance.

Within the classroom and within the office, the user may use the computer 34 for system monitoring.

System monitoring may be done by the user from any room.

File Cabinet Icon

The file cabinet 38 gives the user access to information stored and maintained by the IMS. This information includes student and staff records, schedules, courseware assignments, and reports. The functions available in the file cabinet 38 vary from room to room.

Within the computer lab, the user may access:
1) learning path editor;
2) courseware assignment;
3) scheduling;
4) reports;
5) my records;
6) student portfolios; and
7) today's schedule.

Within the classroom, the user may access the same functions as within the computer lab.

Within the office, the user may access:
1) user registration;
2) learning path editor;
3) reports;
4) my records; and
5) today's schedule.

Note that the office is the only room where a user may register other users onto the system. Reports may be accessed from any room.

Desk Icon

The IMS allows schools to install and use application software including both custom software and commercial software. When an application is installed, it is classified as a productivity tool, a reference tool, or a utility tool. A desk 36 within each of the rooms gives access to productivity and utility tools. Within the computer lab, the user may access both productivity and utility tools. Otherwise, within the classroom and the office, only productivity tools are available.

Bookshelf Icon

Figure 16:
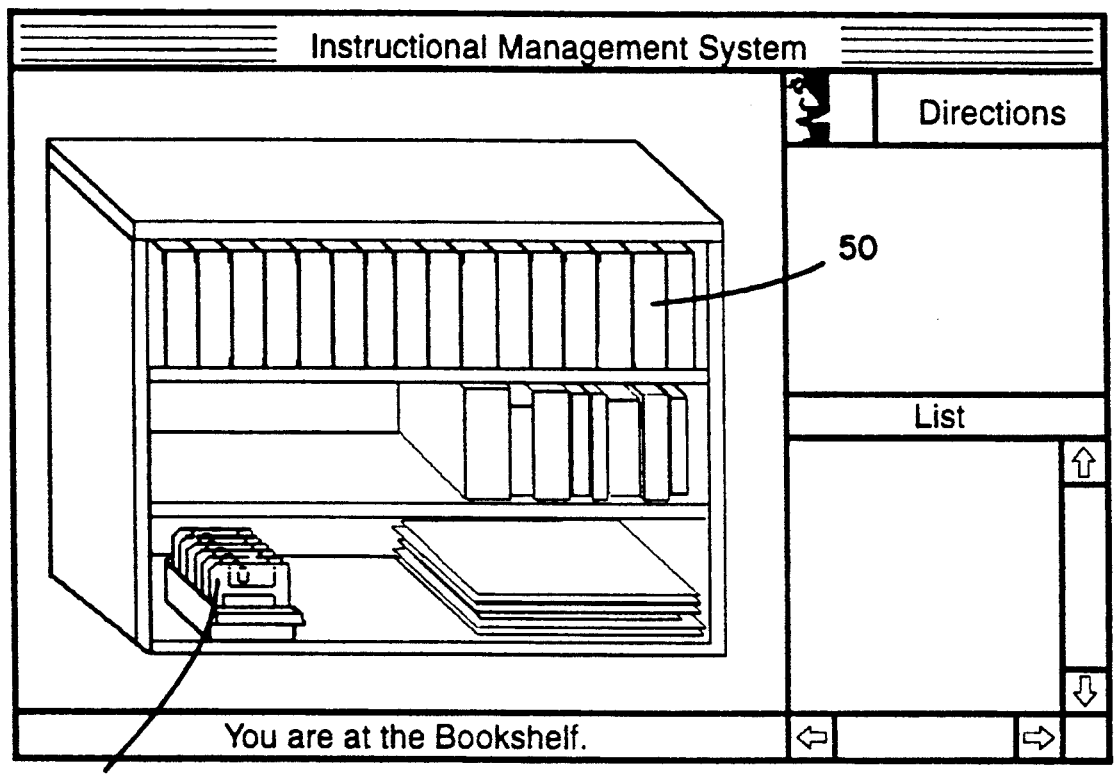
FIG. 16 is a screen view of a virtual school bookshelf compatible with the present invention.

The bookshelf 40 as shown in FIG. 16 is similar to the desk 36 in that it gives the user access to tools. The bookshelf 40 provides reference tools which are available in all of the rooms. Typically, the bookshelf 40 contains reference books 50 and multi-media materials 52.

Learning Path Editor

Figure 17:
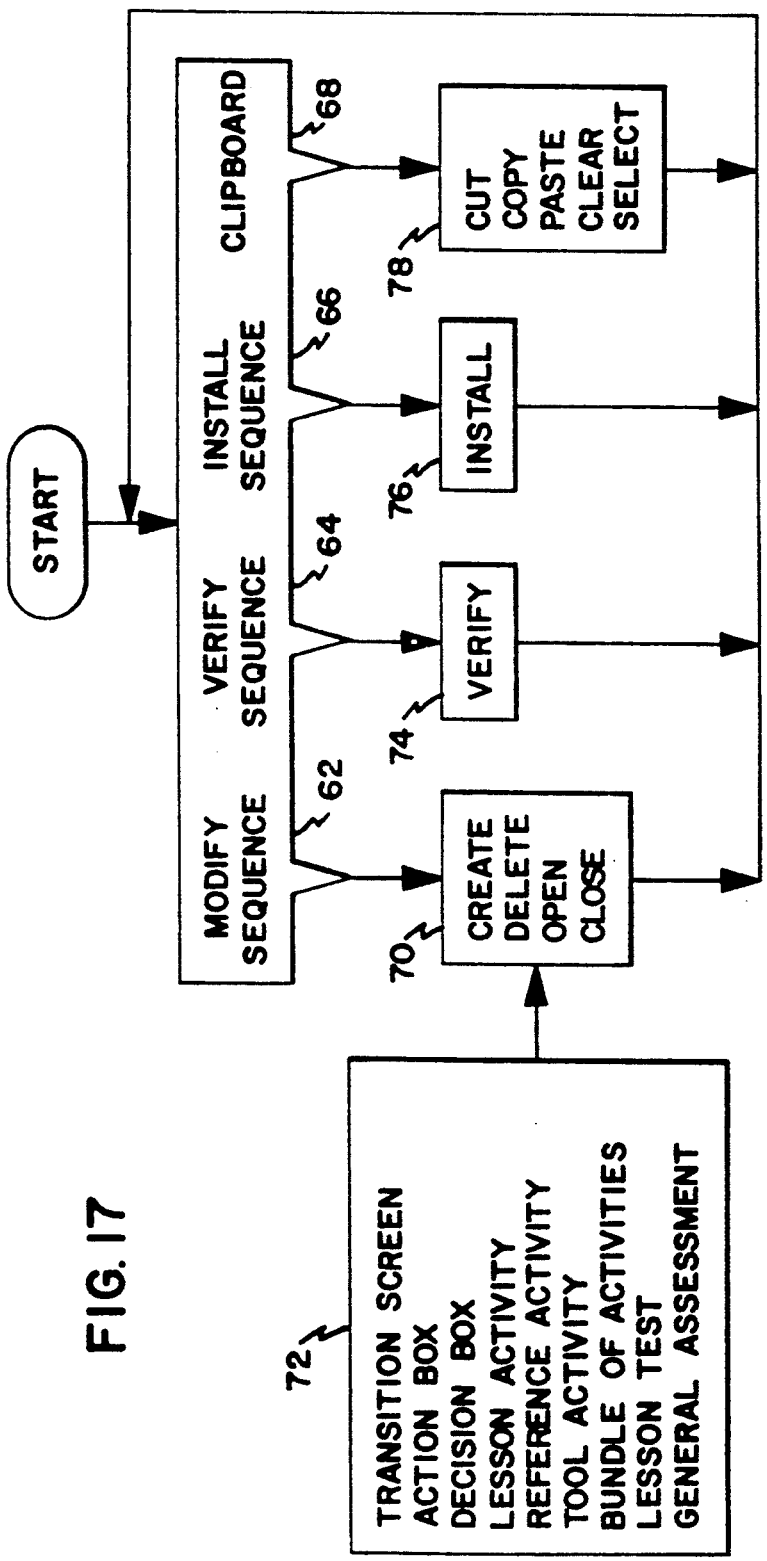
FIG. 17 is a flow diagram of a learning path editor compatible with the present invention.

FIG. 17 illustrates a utility called a learning path editor (LPE) for authoring curriculum sequences from instructional materials using graphical icons displayed on the video screen to represent various elements of the curriculum sequences and the interaction therebetween. The instructional materials comprise a database of lessons and associated assessment elements, including objectives, activities, tools, references, test items, themes, and processes.

To use the LPE, the user must access a room in the virtual school, select the File Cabinet icon 38, and then select the LPE from the list of functions displayed in response thereto. The LPE is a CAD-like utility that allows a user to construct the curriculum sequences by creating flow charts on the video display screen through the manipulation of graphic symbols (icons), thereby tying together one or more universal elements to form a "flow." The LPE allows the user to create, modify and customize sequences.

FIG. 17 is a flow chart describing the functions that are available in the LPE: modify sequence 62, verify sequence 64, install sequence 66, and clipboard 68. If modify sequence 62 is selected, a submenu 70 allows a user to perform actions 72 on elements including creating, deleting, opening, closing, editing, and copying sequences. If verify sequence 64 is selected, the LPE verifies the technical integrity of sequences at 74. If install sequence 66 is selected, the sequence is installed at 76. If the clipboard 68 is selected, a submenu 78 with clipboard options is presented to the user, including temporarily storing sequences, and cutting, copying, pasting, clearing, and selecting sequences to and from the clipboard.

FIG. 18 illustrates a sample curriculum sequence constructed as a flow chart using the LPE. In accessing the sequence, a student begins with the Adding Fractions unit, continues with the Subtracting Fractions unit, and then takes a unit test. Next comes a decision box wherein, depending on how the student does on the unit test, the system sends the student down one of three branches, i.e., a Remediation path if the student fails the test so that the Fractions Review unit can be accessed; a Core path if the student passes the test; and an Enrichment path if the student passes with the highest score so that the student can access the Fun With Fractions unit. The Remediation and Enrichment paths may contain decision boxes, but they must rejoin the Core path at some point. Note also that the last element in the sequence shown in FIG. 18 is a transition screen.

When the user creates a new sequence, the general procedure is to drag icons from an icon panel and position them in the Core path, the Remediation path or the Enrichment path on the video display screen. The system then "snaps" them into place on the flow chart and draws the flow arrows so that the end result is a flow chart diagram like that one shown in FIG. 18.

FIG. 18 also illustrates the icon representations of elements of a curriculum sequence. A curriculum sequence is typically comprised of Units (named flows comprising the flow elements below), General Assessments (tests created to assess understanding of Objectives), Transition Screens (text screens that explains proceedings to the student), Action Boxes (similar to a Transition Screen, but generate messages to a teacher), and Decision Boxes (decision points for choosing alternate pathways, e.g., branching, through a flow). Units are typically comprised of General Assessments, Transition Screens, Action Boxes, Decision Boxes, Lesson Activities (activities with a specific Lesson, e.g., courseware application), Reference Activities (guided activities with a specific Reference Tool, e.g., encyclopedia), Tool Activities (guided activities with a specific Productivity Tool, e.g., word processor), Bundles of Activities (a group of Activities with min/max completion limits, Lesson Tests or Quizzes (tests created to assess understanding of Lesson Activities). These elements are further defined below.

A Unit is the primary building block of Sequences. Units are themselves constructed from the lower-level flow elements. Hence, a Unit can be referred to in two ways: as a flow element used inside of a Sequence, or as the current Unit which is currently loaded into the Unit editing screen of the LPE. The Name of the Unit must be unique; the Author can be a person or a company; and the Grade Range, Subject, and Description are used to help filter Units when selecting them for inclusion in a Sequence. When creating the Unit, the user may assign Objectives to the Unit for use with General Assessments.

A General Assessment is intended to assess the understanding of recently covered Objectives associated with Units.

A Transition Screen can be placed anywhere in Core, Reinforcement, or Enrichment flows of the current Sequence or current Unit. A Transition Screen is simply some text which appears on the screen. The font size and screen background can be based upon some age-appropriate templates supplied with the system. The proper template can be chosen from the Grade Range of the Sequence that includes the Transition Screen. A Transition Screen is identified as INTRODUCTORY or SUMMARY to associate it with the subsequent or preceding element in the flow.

An Action Box can be placed anywhere in Core, Reinforcement, or Enrichment flows of the current Sequence or current Unit. The Action Box simply sends a text message to a teacher when the student arrives at the Action Box in the flow.

A Decision Box can be placed into the Core flow of the current Sequence or current Unit at any point to cause a branch to a Core, Reinforcement or Enrichment flow based on scored events. Scored events are generated by General Assessments, Lesson Activities, and Lesson Tests. For example, if a General Assessment covered five Objectives, then a series of Decision Boxes, each configured to examine the score of a particular one of the Objectives, can direct the student to an appropriate Core, Reinforcement, or Enrichment Flow.

A Lesson Activity is a self-contained, computer-based learning activity. Placing this flow element into a Unit delivers a specific lesson, e.g., application, to a student when they reach the specified position in the Unit Note that there is a distinct difference between a "Lesson" and a "Lesson Activity." The Lesson Activity is a flow element that, among other properties, specifies which Lesson (application) to deliver to the student. The name of the Lesson could be selected from a list of appropriate Lessons (filtered by grade-level or by Objective).

Reference Activities, while similar to Lessons, are distinct in that they involve the guided use of some Reference Tool, such as an online encyclopedia. Guided use occurs through a template which guides the student through the activity. Without this guided use, this activity is basically a period of time allocated for working with the Reference Tool. There is no significant technical distinction between a Tool Activity and a Reference Activity.

Bundles of Activities can be placed into the Core, Reinforcement, or Enrichment flows of the current Unit. A Bundle of Activities specifies two or more Lesson Activities, Reference Activities, or Tool Activities on which, through a menu, the student may select to work in any order. After selecting an activity the student must complete it before selecting another.

A Lesson Test is similar to a General Assessment in that it is intended to assess the understanding of recently covered Objectives associated with Lesson Activities.

Courseware Scheduler

The IMS also includes a Courseware Scheduler for delivering specific courseware to specific computers during specific time periods. The Scheduler includes templates for identifying computers, sessions, courseware assignments, and the dates when specific courseware assignments will be provided to specific computers. The courseware scheduler also comprises means for creating, changing, and deleting schedule templates identifying the courseware to be presented on the computers, means for viewing templates, and means for creating and editing a schedule for a current date in the template.

The purpose of the Courseware Scheduler is to program the system to deliver specific Courseware Assignments to specific workstations during specific time periods. The end result will be a Schedule for every workstation. However, it would be too cumbersome for a user to individually create a schedule for every workstation, therefore the following description and events present a manageable and convenient method for scheduling.

Figure 19:
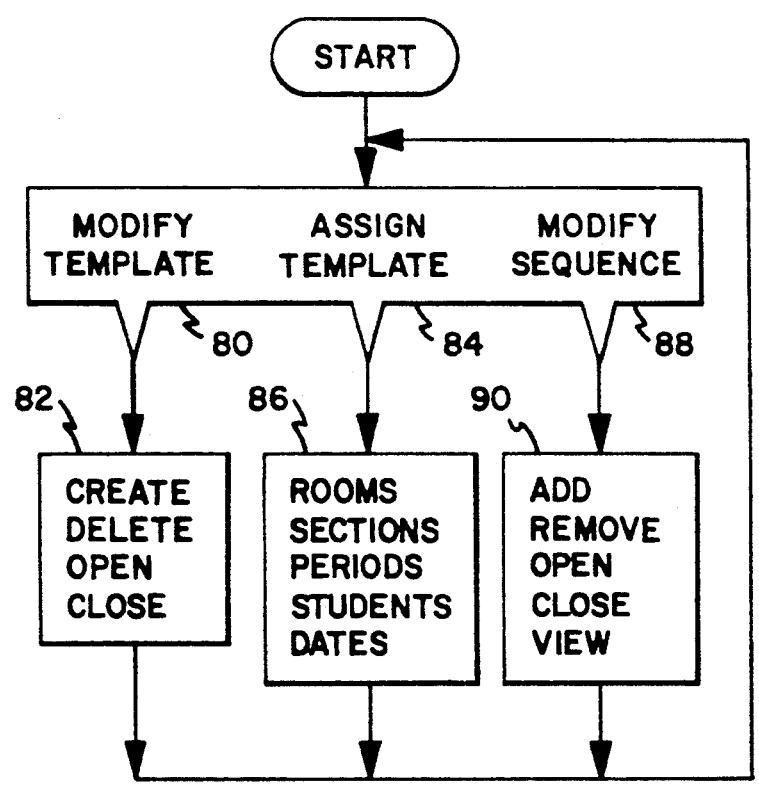
FIG. 19 is a flow diagram of a courseware scheduler compatible with the present invention.

FIG. 19 is a flow chart illustrating the functions available in the Courseware Scheduler. If modify template 80 is selected, a submenu 82 is presented to allow a user to create, delete, open, or close a template. If assign template 84 is selected, a submenu 86 is presented to allow the user to assign by rooms, sections, periods, students, or dates. If modify sequence 88 is selected, a submenu 90 is presented to allow the user to add, remove, open, close, or view a sequence.

Before Scheduling can be done several tasks must be completed. The number of workstations available and a logical grouping of the workstations (e.g., by room) must be specified during School Setup. All the users to be scheduled should be registered, assigned to groups, and given Courseware Assignments.

Based on experience gained from previous management systems, the user will bring to the Scheduler a predefined set of workstations, sessions, Courseware Assignments, and dates on paper or in the user's mind. This information must be easily transferred from the user into the system. The Scheduler makes that transfer of information as easy and logical as possible with the following functions:

Create, change, and delete Schedule Templates
View a System Schedule
Create and edit Today's Schedule A Template contains the workstations, sessions, Courseware Assignments and the dates these will apply. Any changes to the schedule are made to a Template and will automatically be applied to the specified dates, rather than having to make the changes manually for every date.

The Workstations and Sessions specified in a Template define Vacancies. Reservations are made by assigning Courseware Assignments to Vacancies. A Reservation may consist of one or more Courseware Assignments and can be made individually or by group. If a Reservation for a group is made to a single Vacancy, the group must be a Cooperative Group for which only the Courseware Assignments of the Cooperative Group can be selected.

A Vacancy is available for log-on by any user. When a user logs on at a Vacancy, the System will automatically make a Reservation for the user. This automatic Reservation will have a Reservation Type attribute "Scheduled." When Reservations are made, two additional attributes must be set. The first is the Termination Option, the second is the method of Rotation.

Termination Option is an attribute of a Reservation which specifies how the Reservation may be terminated. There are four possible values of the Termination Option:

1) Student Termination to Next Session: The student can end the Reservation early or work beyond the specified end time of the Session. If a student ends the Reservation early, the Start time of the next Slot, if one exists, is set to the current time (thus initiating it).
2) Student Termination: The student can end the Reservation early or work beyond the specified end time of the Session. If a student ends the Reservation early, the Slot becomes a Vacancy.
3) Student or Scheduled Termination: The student can end the Reservation early but is not permitted to work beyond the end of the Session. If a student ends the Reservation early, the Slot becomes a Vacancy.
4) Scheduled Termination: The end of the Reservation is determined by the end of the Session only. The student is not permitted to end the Reservation early or work beyond the specified end of the Session.

Rotation method is the other attribute of a Reservation that specifies the method to determine which Courseware Assignment will be delivered. There are two methods available:

1) Student Choice: The student may select which Courseware Assignment to work on after the completion of a Learning Event.
2) Rotation Order: When a Learning Event is completed, the system will make an appropriate selection for the next Courseware Assignment based upon the rotation order and Rotation Marker in the Reservation. The rotation order is the order in which Courseware Assignments were selected for the Reservation, and the Rotation Marker initially points to the first one.

Once a Template has been created or edited, it must be saved. If the Template has been assigned dates, then it goes through a verification process before being saved. This will ensure that there are no simultaneous assignments, such as a Session from one Template overlapping a session from another Template with the same date assignment. The verification process also ensures that a student is not scheduled to be in more than one place at one time. If a simultaneous assignment is detected, the user is notified of the type of conflict, session overlap or multiple assignment of students, and the name of the Template the conflict involves. If conflicts are found, the user is given the option to continue the process and look for additional conflicts, cancel to allow time to correct the conflicts, or exit the Scheduler without saving. The user will not be allowed to save the Template without resolving conflicts.

To make it easier for a user to construct Templates with common characteristics, the Scheduler will provide two copy functions. The first copy function allows the user to copy the contents of a Template, excluding the date assignments, to a new Template. This will make it easier for the user to create Templates that have very few differences. The second copy function allows the user to copy the contents of a session within a Template to another session in the same or a different Template. This copy function allows the user to easily make Reservations that are identical across different Sessions.

As the scheduling process proceeds, the user will want to see the results of a Template created, how the Template melds with other Templates assigned to the same date, and what a station's availability is for additional scheduling. This can be accomplished by generating a System Schedule for a specific date and viewing its properties. A System Schedule is generated by taking the date specified and examining all Templates with a matching date assignment and extracting its Reservations and Vacancies into one object. The properties of a System Schedule include all Reservation and Vacancy information, including the origin of the Vacancies and Reservations, namely the Template names from which they are defined. Vacancies generated by the system show the availability of a workstation. These system generated Vacancies are created to identify and account for those blocks of times not covered by a Template. The addition of Templates assigned to a date will change the vacancies needed to be generated by the system.

It is impractical to maintain a System Schedule for every date specified in the Templates. A more practical approach is to generate a System Schedule upon demand. These demands could be a user request to view a System Schedule for a specific date, or the system's need to run off a single System Schedule for the current date. The System Schedule generated for the current date is called Today's Schedule. Today's Schedule is used by the Application Delivery module to determine what is to happen at a workstation throughout the day. The Scheduler allows the user to change Today's Schedule without altering the Templates from which Today's Schedule was generated. The changes made to Today's Schedule are made on a Reservation or Vacancy basis.

System Monitor

Figure 20:
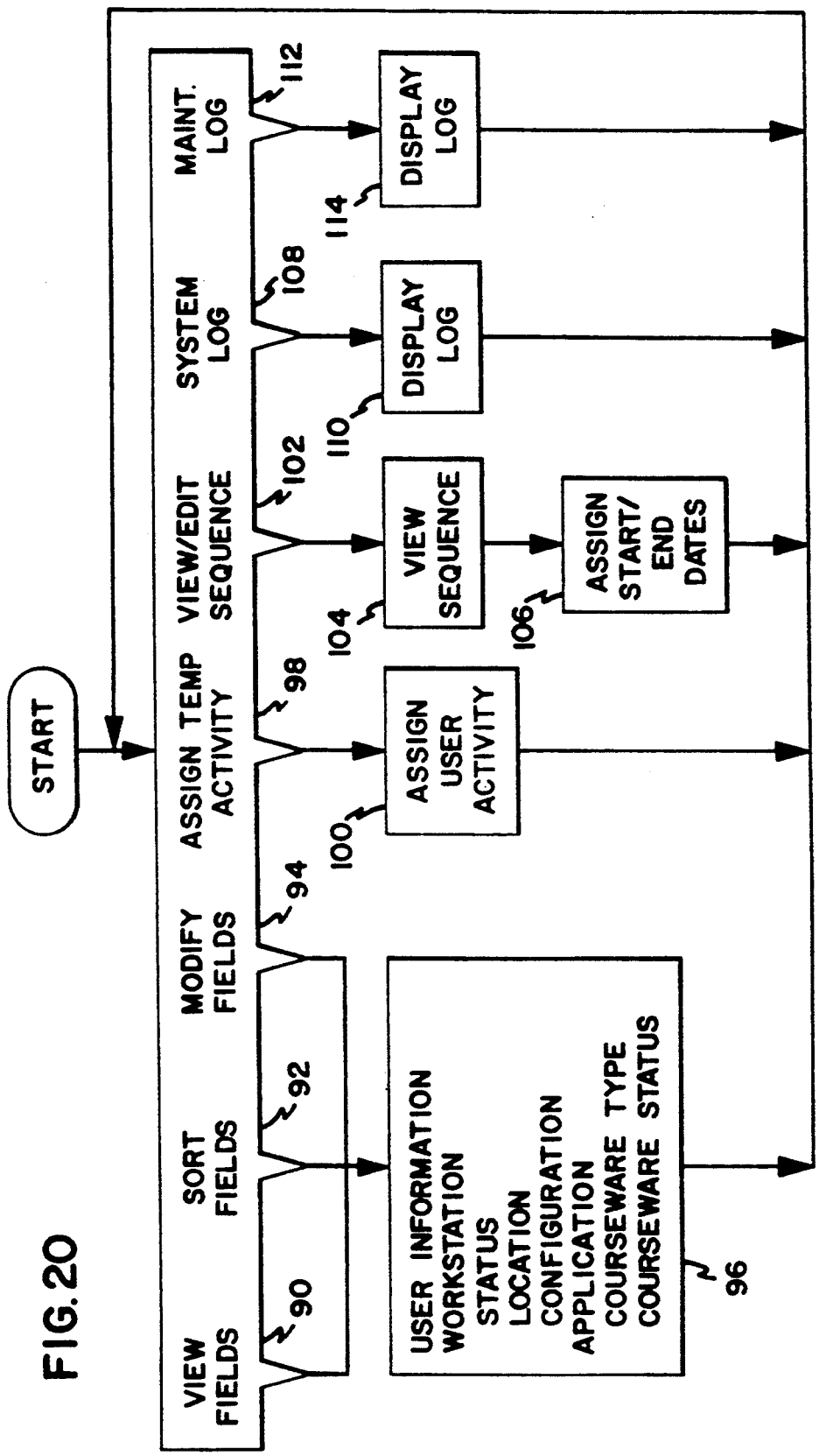
FIG. 20 is a flow diagram of a system monitor compatible with the present invention.

FIG. 20 is a flow chart illustrating the System Monitor functions available in the IMS. The System Monitor gathers information that describes the state of each workstation and then provides that information for the user to view, as shown in FIG. 20. If either view fields 90, sort fields 92, or modify fields 94 are selected, a submenu 96 is presented to allow a user to perform the desired function on user information, workstation information, or application information. If assign temporary activity 98 is selected, a temporary activity is assigned to a student at 100. If view or edit sequence 102 is selected, the sequence may be viewed at 104 and start and end dates assigned at 106. If system log 108 is selected, the system log is displayed at 110. If maintenance log 112 is selected, the maintenance log is displayed at 114.

The System Monitor presents the state of the system in two formats, a graphical format and a list format. The System Monitor allows the user to specify which workstations to monitor. For the graphical presentation, the user will specify the workstations by selecting which room is to monitor. For the list presentation, the user specifies which workstations are to be monitored by selecting those workstations that have Students that belong to a particular Section or by selecting one or more Rooms. For the list presentation the user may also specify which status items will be used for sorting the information to be displayed.

The System Monitor looks at the Schedule to get initial information as to what the state of the system is scheduled to be, then polls the workstations to get the actual state of the system. The schedule and workstations are continually examined and polled to provide the user with the latest information.

From the System Monitor, the user may select a command along with one or more workstations and pass the command and information of the workstations' state, or status items, as input to another module. The commands available and the modules they are sent to are described as follows:

1) NEXT and TEMP SEQUENCE are commands sent to Courseware Assignment. The NEXT command provides a fast way for the user to access the Courseware Assignment Module and bump the one or more students selected to the next learning event in their current Sequence. The TEMP SEQUENCE command provides quick access to the Courseware Assignment module to assign a temporary sequence to the one or more students selected.

2) TERMINATE and MOVE are commands sent to the Scheduler. The TERMINATE command provides a quick way for the user to access the Scheduler to cancel the one or more reservations selected. The MOVE command allows the user to easily change a reservation in order to move a student assignment from one station to another.

The state of each workstation is described by several pieces of information called status items. The status items include User Information, Workstation Information, and Application Information.

The User Information includes User Name, User Classification, and Reservation Type. The User Information is only displayed if the user is scheduled or is currently using the workstation.

The Workstation Information includes Workstation Identification, Status, Room Number, and Device Configuration.

The Application Information includes Name, Type, Sequence Name, Branch Type, and Status. If an application is currently scheduled to run or is running, Application Information will be displayed, otherwise these fields are left blank. The fields of Application Information are further described below.

The Application Types include the values of:
LESSON—A lesson of a Sequence.
UNIT TEST—A unit test of a Sequence.
QUIZ—A quiz of a Sequence.
REFERENCE—An application such as Compton's Multimedia Encyclopedia or a card catalogue, from a reference activity in a Sequence.
TOOL—An application such as a Word Processor, from a tool activity in a Sequence.
PRODUCTIVITY TOOL—Third party applications such as a grade book or spreadsheet.
IMS APPLICATION—Management system applications, such as the LPE or the Scheduler.

The Sequence Name is the name of the sequence to which the application belongs.

The Branch Types include the values of:
CORE—The core path of the current unit.
REMEDIAL—The remedial path of the current unit.
ENRICHMENT—The enrichment path of the current unit.

The Application Status includes the values of:
LOADING—The application and data is being downloaded.
EXECUTING—The application is being executed.
SAVING RESULTS—The results of a courseware application are being saved to the database.
RESTARTING—The application is in the process of restarting.
TERMINATING—The application is in the process of terminating.

Guidance Tutor

Figure 21:
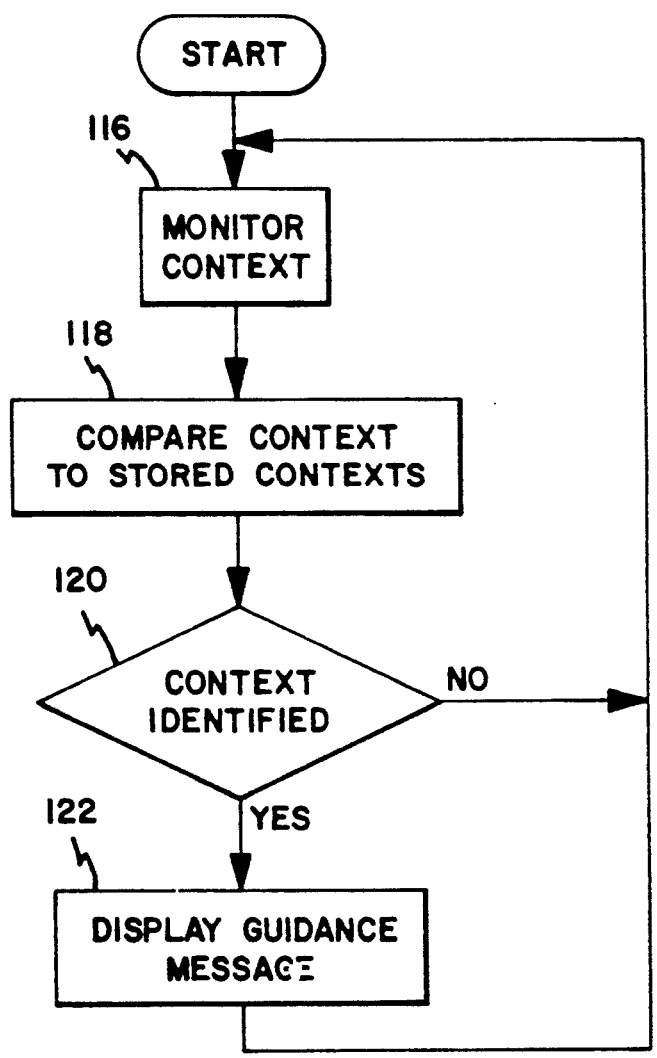
FIG. 21 is a flow diagram of a guidance tutor compatible with the present invention.

Real-time guidance is a pervasive IMS facility which offers context directed coaching during a user's interaction with IMS software. Guidance is provided in the form of a short textual message intended to help the user complete the task at hand, as shown in FIG. 21. Presentation of guidance messages occurs in a tiled window which does not obscure the presentation of other elements of IMS. In order to display guidance messages, at 116 the context of the current activity is monitored. At 118, the current context is compared to a list of stored contexts. At 120, if the current context is identified, a guidance message is displayed at 122, otherwise control returns to 116.

During Product Design, Guided Contexts will be defined for selected user interface states in each component of IMS. Textual messages are associated with each state.

At all times, the system maintains a value representing the current Guided Context. This value may be null indicating that the current Guided Context is undefined. When the guidance window is open, the current Guided Context determines a textual guidance message to be displayed in this window. The guidance message for an undefined context is blank.

Each IMS subsystem will notify the guidance tutor of its current Guided Context. The subsystem specifies a Guided Context by Context-ID. It is the Guidance Tutor's responsibility to associate each Context-ID with a Guidance-Message. The current Guided Context may be undefined and when it is, the guidance message is blank.

The Guidance-Message is available to all users. In IMS, the Guidance-Messages which appear will be solely based on the current user interface state (or more precisely, the current Guided Context). In other words, every user which has access to a particular part of IMS will see the same Guidance-Message for the same context.

Conclusion

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A user interface apparatus of an instructional management system for presenting text and graphics information to a user, the interface being targeted to scholastic environments and comprising:
    (a) at least one computer connected to a computer network, the computer having user input means, a video screen, and data storage means coupled thereto;
    (b) instructional and administrative information stored in an electronic format in the data storage means of the computer; and (c) virtual school means, operated by the computer and coupled to the data storage means, for providing a networked virtual reality environment so that one or more users of the compute network can access the instructional and administrative information by grouped functions, wherein the user selects among the grouped functions by first accessing one of a plurality of representations of rooms within a school representation as displayed on the video screen and then accessing at least one representation of office equipment within the accessed room as displayed on the video screen, the networked virtual reality environment thereby presenting the user as a real-time entity within the virtual school means so that the user interfaces with others users and elements therein; wherein the virtual school means comprises:

(1) front door means, indicated by a front door graphic on the video screen, for providing entry into the virtual school means, the front door means further comprising school security means, indicated by a doorknob graphic displayed on the video screen within the front door graphic, for controlling access to the virtual school means by requesting a name and a password from a user when the doorknob graphic is accessed;

(2) school map means, indicated by a map graphic of a school representation displayed on the video screen, for providing access among the plurality of rooms in the virtual school means;

(3) hallway means, indicated by a hallway graphic displayed on the video screen, for traversing among the room in the virtual school means;

(4) office means, indicated by an office graphic displayed on the video screen, for providing administrative functions including the generation of administrative reports for the virtual school means;

(5) classroom means, indicated by a classroom graphic displayed on the video screen, for providing shared access to lessons, tools, and references within the virtual school means;

(6) computer laboratory means, indicated by a computer laboratory graphic displayed on the video screen, for providing system management functions including the generation of reports, setting up the virtual school means, and assigning a learning path to a student;

(7) media center means, indicated by a media center graphic displayed on the video screen, for providing audio-visual management functions within the virtual school means; and (8) lounge means, indicated by a lounge graphic displayed on the video screen, for providing communications functions within the virtual school means, including the accessing of a public bulletin board for teachers, electronic mail, and external online information services.

2. The user interface apparatus of claim 1 above, wherein the classroom means further comprises:

(i) teacher desktop means, indicated by a teacher desk graphic displayed on the video screen, for providing teaching functions including the assignment of curriculums, the planning of lessons, and the creation of tests;

(ii) student desktop means, indicated by a student desk graphic displayed on the video screen, for providing learning functions including the selection of a course sequence to be taught;

(iii) bookshelf means, indicated by a bookshelf graphic displayed on the video screen, for providing shared access for teachers and students to electronic reference works;

(iv) file cabinet means, indicated by a file cabinet graphic displayed on the video screen, for providing access for teachers to student records;

(v) computer means, indicated by a computer graphic displayed on the video screen, for allowing teachers to monitor student activity on the network; and the media center means further comprises:

(i) means for generating reports on any type of material recorded in the instructional information;

(ii) means for electronic book reservation; and (iii) means for electronic check in and check out of any type material within the media center means.

3. The user interface apparatus of claim 1 above, further comprising means for monitoring and maintaining the computers from within the office means, classroom means, computer laboratory means, media center means, and lounge means.

4. A user interface apparatus of an instructional management system for presenting text and graphics information to a user, the interface being targeted to scholastic environments and comprising:

(a) at least one computer connected to a computer network, the computer having user input means, a video screen, and data storage means coupled thereto;

(b) instructional and administrative information stored in an electronic format in the data storage means of the computer;

(c) virtual school means, operated by the computer and coupled to the data storage means, for providing a networked virtual reality environment so that one or more users of the computer network can access the instructional and administrative information by grouped functions, wherein the user selects among the grouped functions by accessing one of a plurality of rooms within a school representation displayed on the video screen, the networked virtual reality environment thereby presenting the user as a real-time entity within the virtual school means so that the user interacts with other users and elements therein, wherein the virtual school means further comprises:

(1) main panel means, operated by the computer and displayed on the video screen, for presenting the instructional and administrative information along substantially the majority of one side of the screen;

(2) the portion of the video screen not occupied by the main panel means divided substantially into first, second, and third sections;

(3) directions panel means, operated by the computer, for guiding the user in correct and efficient use of the user interface by displaying instructions on the video screen, the directions panel means being displayed in the first section of the video screen and comprising:

(i) text means for displaying text on the video screen directed to on-line training and help functions for the user interface;

(ii) tutor means for presenting audio and full-motion video on the video screen in conjunction with the test displayed in the text means;

(4) list panel means, operated by the computer, for presenting information from a currently active database on the video screen and accessing the database elements, the list panel means being displayed in a second section of the video screen; and (5) status panel means, operated by the computer, for displaying a message indication describing which room the user is in and the function being performed.

5. An instruction management system, comprising:
(a) a computer having user input means, a video screen, and data storage means coupled thereto;
(b) instructional material stored in an electronic format in the data storage means of the computer, the instructional material comprising a database of lessons, references, tools, and associated assessment elements for presentation by the computer; and
(c) learning path editor means, operated by the computer and coupled to the data storage means, for authoring curriculum sequences from the instructional materials using graphical icons displayed on the video screen to represent various elements of the curriculum sequences and the interaction therebetween wherein the learning path editor means comprises: (1) modify means for creating, deleting, opening, closing, editing, and copying sequences; (2) verify means for verifying the technical integrity of sequences; (3) install means for installing a verified sequence onto the system; and (4) clipboard means for temporarily storing sequences, and edit means for cutting, copying, pasting, clearing, and selecting sequences to and from the clipboard means.

6. The instruction management system of claim 5 above, wherein the database of lessons and associated assessment elements further comprises databases of objectives, activities, tools, references, test items, themes, and processes.

7. The instruction management system of claim 5 above, wherein the curriculum sequences comprise flow charts.

8. The instruction management system of claim 5 above, wherein the curriculum sequences comprise remediation paths when a student fails a unit assessment.

9. The instruction management system of claim 5 above, wherein the curriculum sequences comprise core paths when a student passes a unit assessment.

10. The instruction management system of claim 5 above, wherein the curriculum sequences comprise enrichment paths when a student passes a unit test with a high score.

11. The learning path editor means of claim 5 above, wherein the curriculum sequences comprise a plurality of universal elements, and the universal elements comprise:
(1) message screen element means for displaying explanatory text to a student;
(2) action box element means for initiating one or more actions to affect a sequence, the actions comprising branching to another sequence, printing a sequence, and terminating a sequence;
(3) decision box element means for specifying a decision point for choosing alternate pathways through a sequence;
(4) activity means for presenting a specific lesson to a student;
(5) reference means for guiding the student through an activity with a specific reference tool;
(6) tool means for guiding the student through an activity with a specific productivity tool;
(7) choice set of activities means for presenting a group of activities with minimum and maximum completion criteria to the student; and
(8) unit test means for assessing the student's understanding of an objective of a lesson activity.

12. The learning path editor means of claim 11 above, wherein the choice set of activities means further comprises function means for allowing the student the undirected use of lessons, tools and references.

13. A scheduling apparatus for an instructional management system, comprising:
(a) a plurality of computer coupled together in a computer network each having user input means and a video screen coupled thereto;
(b) instruction management means, coupled to the computers, for delivering courseware for presentation on the video screens of selected computers; and
(c) scheduling means, coupled to the computers and integrated with the instruction management means, for delivering specific courseware to specific computers during specific time periods, wherein the schedule means further comprises templates for identifying computers, sessions, courseware assignments, and the dates when specific courseware assignments will be provided to specific computers, the scheduling means further comprising:
(1) means for creating, changing, and deleting schedule templates identifying the courseware to be presented on the computers,
(2) means for viewing templates, and
(3) means for creating and editing a schedule for a current date in the template.

14. A system monitor apparatus for an instructional management system, comprising:
(a) at least one workstation coupled together in a computer network;
(b) instruction management means, operated by one of the workstations and coupled for communication with the remaining workstations, for delivering courseware for presentation on selected workstations; and
(c) system monitor means, operated by one of the workstations and coupled for communication to the remaining workstations and the instruction management means, for gathering information in real-time on the state of each of the workstations, wherein the gathered information includes user information describing the status of the user working on the workstation, workstation information describing the status, location and configuration of the workstation, and application information describing the type and status of the courseware operating on the workstation, wherein the system monitor means further comprises: (1) means for viewing in real-time a set of predefined information fields; (2) means for sorting the information by the list of predefined information fields; (3) means for assigning a temporary activity sequence to a user; (4) means for viewing sequence information and for assigning start and end dates for a temporary sequence to a user; and (5) means for logging and displaying system log information and system maintenance log information.

15. The system monitor apparatus of claim 14 above, wherein the user information comprises a user name, a user classification, and a reservation type.

16. The system monitor apparatus of claim 14 above, wherein the workstation information comprises a workstation identification, a workstation status, a room number, and a device configuration.

17. The system monitor apparatus of claim 14 above, wherein the application information comprises a courseware name, a courseware type, a sequence name, a branch type, and a courseware status.

18. The system monitor apparatus of claim 14 above, further comprising means for modifying workstation information, changing, restarting and terminating a user activity, moving a user from one workstation to another workstation, and shutting down a workstation.

19. The system monitor apparatus of claim 14 above, further comprising means for logging and displaying system log information, user logs on and log outs, user remote reassignments, system maintenance log information, system start ups and shut downs, database file imports and exports, system backups, and system software upgrades.

* * * * *

UNITED STATES PATENT AND TRADEMARK OFFICE
CERTIFICATE OF CORRECTION

PATENT NO. : 5,310,349
DATED : May 10, 1994
INVENTOR(S) : Dan B. Daniels et al.

It is certified that error appears in the above-identified patent and that said Letters Patent is hereby corrected as shown below:

```
    Column 17, line 4, "compute" should read --computer--;
line 15, "others" should read --other--.

Column 20, line 18, "computer" should read --computers--.
```

Signed and Sealed this

Twenty-second Day of November, 1994

Attest:

BRUCE LEHMAN

*Attesting Officer*   *Commissioner of Patents and Trademarks*